United States Patent
Lasnier

(10) Patent No.: US 9,269,132 B1
(45) Date of Patent: Feb. 23, 2016

(54) NIGHT VISION DETECTION ENHANCEMENTS IN A DISPLAY SYSTEM

(71) Applicant: CAE Inc., Saint-Laurent, Montreal (CA)

(72) Inventor: Sylvain Lasnier, Laval (CA)

(73) Assignee: CAE INC., Montréal (CA)

( * ) Notice: Subject to any disclaimer, the term of this patent is extended or adjusted under 35 U.S.C. 154(b) by 0 days.

(21) Appl. No.: 14/674,532

(22) Filed: Mar. 31, 2015

Related U.S. Application Data

(63) Continuation of application No. PCT/CA2015/000208, filed on Mar. 31, 2015.

(51) Int. Cl.
*G09G 5/00* (2006.01)
*G06T 5/00* (2006.01)
*G09G 5/02* (2006.01)
*G06F 3/01* (2006.01)
*G09G 5/30* (2006.01)

(52) U.S. Cl.
CPC ............... *G06T 5/009* (2013.01); *G06F 3/012* (2013.01); *G06F 3/013* (2013.01); *G09G 5/003* (2013.01); *G09G 5/02* (2013.01); *G09G 5/30* (2013.01); *G06T 2207/20208* (2013.01); *G09G 2320/0666* (2013.01); *G09G 2320/08* (2013.01); *G09G 2354/00* (2013.01)

(58) Field of Classification Search
CPC ........ G09B 9/36; G09B 9/02; B60R 2300/00; B60R 2300/106
USPC ......... 434/44, 36, 38, 41, 43; 345/467, 472.3, 345/7, 9; 348/122, 123, 33; 250/330
See application file for complete search history.

(56) References Cited

U.S. PATENT DOCUMENTS

| 5,137,450 | A   |   | 8/1992  | Thomas                  |
|-----------|-----|---|---------|-------------------------|
| 5,380,204 | A   | * | 1/1995  | Decker ............ 434/36 |
| 6,078,427 | A   | * | 6/2000  | Fontaine et al. ...... 359/630 |
| 6,196,844 | B1  |   | 3/2001  | Bradshaw et al.         |
| 6,196,845 | B1  | * | 3/2001  | Streid ............ 434/44 |
| 6,826,523 | B1  |   | 11/2004 | Guy et al.              |

(Continued)

OTHER PUBLICATIONS

Dörr et al, "Virtual Cockpit Simulation for Pilot Training", Institute for Flight Mechanics and Control, Technical University Dermstadt, Germany, presented at RTO HFM Workshop on 'What is Essential for Virtual Reality Systems to Meet Military Human Performance Goals?', Apr. 13-15, 2000, pp. 11-1 to 11-7, published in RTO MP-058.

*Primary Examiner* — Jacinta M Crawford
(74) *Attorney, Agent, or Firm* — Gowlings Lafleur Henderson LLP; Benoit Yelle

(57) ABSTRACT

A method and a display system for dynamically activating a night-vision mode. The display system comprises a processor module that further comprises an image generator module. The processor module is for determining at least a head position of a user in the display system, the head position being used at least for geometry-correction purposes and, while determining the head position, determining that a night-vision-enhancer device is activated by the user. The processor module is further for activating the night-vision mode of the display system and the image generator module, upon activation of the night-vision mode of the display system, renders night-vision-enhanced images of a computer generated environment for display. The night-vision-enhanced images present a night-mode-adapted wavelength spectrum.

12 Claims, 5 Drawing Sheets

(56) References Cited

U.S. PATENT DOCUMENTS

| | | | |
|---|---|---|---|
| 8,488,243 | B2 | 7/2013 | McKnight et al. |
| 8,564,622 | B1 | 10/2013 | Quinn et al. |
| 2002/0075210 | A1 | 6/2002 | Nestorovic et al. |
| 2002/0130982 | A1* | 9/2002 | Marshall ............... 349/15 |
| 2003/0091961 | A1* | 5/2003 | Swaine et al. ............ 434/36 |
| 2004/0155186 | A1 | 8/2004 | Nestorovic et al. |
| 2006/0081793 | A1 | 4/2006 | Nestorovic et al. |
| 2006/0114171 | A1 | 6/2006 | Vascotto et al. |
| 2007/0171623 | A1* | 7/2007 | Zagar et al. ............. 362/29 |
| 2007/0218428 | A1* | 9/2007 | Taffet ................... 434/41 |
| 2007/0267567 | A1* | 11/2007 | Filipovich et al. ...... 250/214 VT |
| 2007/0285019 | A1* | 12/2007 | Katoh .................... 315/82 |
| 2008/0158244 | A1* | 7/2008 | Hulet et al. ............. 345/592 |
| 2008/0266669 | A1* | 10/2008 | Durner et al. ........... 359/630 |
| 2009/0253104 | A1* | 10/2009 | Burggraf et al. ......... 434/41 |
| 2009/0306741 | A1* | 12/2009 | Hogle et al. ............ 607/54 |
| 2010/0110308 | A1* | 5/2010 | Nicholson et al. ........ 348/744 |
| 2010/0149081 | A1* | 6/2010 | Shen ..................... 345/88 |
| 2011/0010214 | A1* | 1/2011 | Carruth .................. 705/8 |
| 2011/0111699 | A1* | 5/2011 | Chiang ................... 455/41.2 |
| 2011/0240834 | A1* | 10/2011 | Baudou et al. .......... 250/214 AL |
| 2011/0249014 | A1* | 10/2011 | Kolstad et al. .......... 345/589 |
| 2012/0044461 | A1* | 2/2012 | Chang et al. ............ 353/31 |
| 2012/0257005 | A1* | 10/2012 | Browne .................. 348/36 |
| 2012/0315603 | A1* | 12/2012 | Streid ................... 434/37 |
| 2012/0320103 | A1* | 12/2012 | Jesme et al. ............ 345/690 |
| 2014/0085445 | A1* | 3/2014 | Joao et al. .............. 348/61 |
| 2014/0186810 | A1 | 7/2014 | Falash et al. |
| 2015/0062196 | A1* | 3/2015 | Tripathi ................. 345/690 |

* cited by examiner

2000

```
┌─────────────────────────────────────────────────────────────┐
│ defining a first factor of a viewer's sightline as a lateral│
│ position in a display system of a viewer's body part located│
│    between a viewer's chin and a viewer's waistline 2010    │
└─────────────────────────────────────────────────────────────┘
                              ↓
┌─────────────────────────────────────────────────────────────┐
│    defining a second factor of the sightline as a depth     │
│     position in the display system of the body part 2020    │
└─────────────────────────────────────────────────────────────┘
                              ↓
┌─────────────────────────────────────────────────────────────┐
│   computing the sightline based at least on the first factor│
│                 and the second factor 2030                  │
└─────────────────────────────────────────────────────────────┘
                              ↓
┌─────────────────────────────────────────────────────────────┐
│       generating the stream of images considering the       │
│                  determined sightline 2040                  │
└─────────────────────────────────────────────────────────────┘
                              ↓
┌─────────────────────────────────────────────────────────────┐
│    displaying the stream of images on a first display screen│
│                            2050                             │
└─────────────────────────────────────────────────────────────┘
```

Figure 2

NIGHT VISION DETECTION ENHANCEMENTS IN A DISPLAY SYSTEM

PRIORITY STATEMENT

This non-provisional patent application claims priority based upon the PCT patent application entitled "NIGHT VISION DETECTION ENHANCEMENTS IN A DISPLAY SYSTEM", filed on even date herewith, in the name of CAE Inc., the PCT application being incorporated by reference in its entirety.

TECHNICAL FIELD

The present invention relates to computer generated images and, more particularly, to night-vision computer generated images.

BACKGROUND

In computer simulation, an important aspect is to credibly replicate an actual environment, which facilitates and helps maintaining immersion. In order to remain credible, the image generation in the computer simulation should adapt in a realistic manner to changes in the physical environment. In particular, the image generation should consider whether a night-vision mode is relevant.

The present invention aims at considering when the night-vision image generation mode should be switched on.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A first aspect of a first set of embodiments in accordance with the present invention is directed to a display system comprising a display screen for displaying a stream of images, a viewer positioning module and an image generator module. The viewer positioning module is for determining a viewer's sightline by defining a first factor of the sightline as a lateral position in the display system of a viewer's body part located between the viewer's chin and the viewer's waistline, defining a second factor of the sightline as a depth position in the display system of the body part; and computing the sightline based at least on the first factor and the second factor. The image generator module is for generating the stream of images considering the determined sightline.

The image generator module may further be for generating the stream of images and a second stream of images thereby forming a stream of stereoscopic images. The viewer positioning module may further be for defining a third factor of the sightline as a viewer's eye-level height and horizontal rotational attitude, wherein computing the sightline is further based on the first factor, the second factor and the third factor for ensuring correct generation of the stream of stereoscopic images. The viewer's eye-level height may be calculated by applying a translation value to the position of the body part.

The viewer positioning module may compute the sightline by dynamically determining the lateral position of the body part corresponding to the first factor and combining the lateral position with a static viewer's expected depth position of the viewer in the display system corresponding to the second factor.

The viewer positioning module may compute the sightline by dynamically determining the lateral position of the body part corresponding to the first factor and the depth position of the body part corresponding to the second factor in the display system.

The viewer positioning module may define the third factor of the sightline by dynamically determining the expected eye-level height.

The viewer positioning module, once the body part is determined to be moving, may define at least one of the first factor and the second factor of the sightline further using a predictive relative position factor of the body part.

The viewer positioning module may obtain at least one of the first factor and second factor for the position of the viewer's body part by image recognition matching an expected outfit with a viewer's actual outfit.

The viewer positioning module may obtain at least one of the first factor and second factor for the position of the viewer's body part by determining a reflector position of an infra-red or near infra-red reflector on the body part.

The viewer positioning module may obtain at least one of the first factor and second factor for the position of the viewer's body part by determining a tracker position of a magnetic tracker on the body part.

The viewer positioning module may obtain at least one of the first factor and second factor for the position of the viewer's body part by using ultrasonic reflections.

The viewer positioning module may obtain at least one of the first factor and second factor for the position of the viewer's body part by determining a relative position between a seat of the display system and the body part. The seat may provide an array of position detector for determining the relative position.

The viewer positioning module may obtain at least one of the first factor and second factor for the position of the viewer's body part by determining a wearable device position of a wearable element of the display system worn on the body part.

The image generator module may further load a simulation model from at least one simulation database for generating the stream of images and the display system may further comprise an instrument module for providing at least one physical interface element to the viewer of the display system and a simulation engine module for managing a computer simulation in the display system, the simulation engine module computing the simulation model from inputs obtained from the instrument module and a plurality of simulation parameters of the computer simulation.

A second aspect of the first set of embodiments in accordance with the present invention is directed to a method for displaying a stream of images. The method comprises defining a first factor of a viewer's sightline as a lateral position in a display system of a viewer's body part located between a viewer's chin and a viewer's waistline, defining a second factor of the sightline as a depth position in the display system of the body part, computing the sightline based at least on the first factor and the second factor, generating the stream of images considering the determined sightline and displaying the stream of images on a first display screen.

Generating the stream of images may further comprise generating a second stream of images thereby forming a stream of stereoscopic images. The method may then further comprise defining a third factor of the sightline as a viewer's eye-level height and horizontal rotational attitude. Computing the sightline may thus be further based on the first factor, the second factor and the third factor for ensuring correct generation of the stream of stereoscopic images.

Computing the sightline may comprise dynamically determining the lateral position of the body part corresponding to the first factor and combining the lateral position with a static viewer's expected depth position of the viewer in the display system corresponding to the second factor or dynamically determining the lateral position of the body part corresponding to the first factor and the depth position of the body part corresponding to the second factor in the display system.

The method may further comprise, once the body part is determined to be moving, defining at least one of the first factor and the second factor of the sightline further using a predictive relative position factor of the body part.

At least one of the first factor and second factor for the position of the viewer's body part is defined by image recognition matching an expected outfit with a viewer's actual outfit; determining a reflector position of an infra-red or near infra-red reflector on the body part, determining a tracker position of a magnetic tracker on the body part, using ultrasonic reflections, determining a relative position between a seat of the display system and the body part or determining a wearable device position of a wearable element of the display system worn on the body part.

The method may further comprise loading a simulation model from at least one simulation database for generating the stream of images, providing at least one physical interface element to the viewer of the display system and managing a computer simulation in the display system by computing the simulation model from inputs obtained from the instrument module and a plurality of simulation parameters of the computer simulation.

A first aspect of a second set of embodiments in accordance with the present invention is directed to a display system for dynamically activating a night-vision mode comprising. The display system comprises a processor module that further comprises an image generator module. The processor module is for determining at least a head position of a user in the display system, the head position being used at least for geometry-correction purposes and, while determining the head position, determining that a night-vision-enhancer device is activated by the user. The processor module is further for activating the night-vision mode of the display system and the image generator module, upon activation of the night-vision mode of the display system, renders night-vision-enhanced images of a computer generated environment for display. The night-vision-enhanced images present a night-mode-adapted wavelength spectrum.

The night-vision mode of the display system may be activated on a first display channel of at least two display channels of the image generator module, the first channel being associated with the first user. Upon activation of the night-vision mode of the display system, night-vision-enhanced images may be rendered for display in the night-mode-adapted wavelength spectrum for the first display channel while a second display channel of the at least two display channels does not provide night-vision-enhanced images.

The processor module may further be for determining a second head position of a second user in the display system, the second head position being used at least for geometry-correction purposes, while determining the second head position, determining that a second night-vision-enhancer device is activated by the second user, activating a second night-vision mode of the display system on a second display channel of the at least two display channels of the image generator module associated with the second user and the image generator module being further for, upon activation of the night-vision mode on the first display channel and the second display channel, rendering night-vision-enhanced images of the computer generated environment for display. The night-vision-enhanced images present a night-mode-adapted wavelength spectrum on both the first display channels and the second display channel.

The night-mode-adapted wavelength spectrum may prevent damage to the night-vision-enhancer device. The processor module may further log an event when the night-vision-enhancer device is inappropriately activated.

The night-vision-enhanced images may be stereoscopic night-vision-enhanced images and the processor module may then further be for, while determining the head position, determining a user's sightline and a user's eye-level horizontal rotational attitude for further ensuring correct rendering of the stereoscopic images and, upon activation of the night-vision mode, translating the user's sightline considering the difference between the user's sightline and an expected light-sensor position of the night-vision-enhancer device.

The image generator module may further load a simulation model comprising the computer generated environment from at least one simulation database for generating the images, the at least one simulation database comprising additional data for the night-vision mode for at least one element of the computer generated environment. The display system may further comprise an instrument module for providing at least one physical interface element to the user of the display system and a simulation engine module for managing a computer simulation in the display system, the simulation engine module computing the simulation model from inputs obtained from the instrument module and a plurality of simulation parameters of the computer simulation. Upon activation of the night-vision mode, the instrument module may modify at least one light-emitting system thereof towards a night-mode-adapted wavelength spectrum.

A second aspect of the second set of embodiments in accordance with the present invention is directed to a display system for dynamically activating a night-vision mode comprising a processor module for determining that a night-vision-enhancer device is activated by the user by at least one of: i. detecting a modified eye lighting pattern using image recognition once the night-vision-enhancer device is in active position; ii. detecting an expected night-vision-enhancer device shape using image recognition once the night-vision-enhancer device is in active position; iii. receiving an activation signal from a wireless network interface of the night-vision-enhancer device; iv. detecting a hidden reflector once the night-vision-enhancer device is in active position; v. detecting a hidden emitter once the night-vision-enhancer device is in active position; vi. detecting a modified power consumption pattern once the night-vision-enhancer device is in active position; vii. detecting a modified electromagnetic field in the display system once the night-vision-enhancer device is in active position. The processor module is further for activating the night-vision mode of the display system and an image generator module of the processor module is for, upon activation of the night-vision mode of the display system, rendering night-vision-enhanced images of a computer generated environment for display, the night-vision-enhanced images presenting a night-mode-adapted wavelength spectrum. Determining that the night-vision-enhancer device is activated by the user may be performed by at least once by each of the possibilities i. to vii.

A third aspect of the second set of embodiments in accordance with the present invention is directed to a method for dynamically activating a night-vision mode in a display system comprising determining at least a head position of a user in the display system, the head position being used at least for geometry-correction purposes and, while determining the head position, determining that a night-vision-enhancer device is activated by the user. The method also comprises activating the night-vision mode of the display system and upon activation of the night-vision mode of the display system, rendering night-vision-enhanced images of a computer generated environment for display, wherein the night-vision-enhanced images present a night-mode-adapted wavelength spectrum.

Activating the night-vision mode of the display system may further comprise activating the night-vision mode on a first display channel of at least two display channels of the image generator module, the first channel being associated with the first user. Upon activation of the night-vision mode of the display system, night-vision-enhanced images are rendered for display in the night-mode-adapted wavelength spectrum for the first display channel while a second display channel of the at least two display channels does not provide night-vision-enhanced images.

The method may further comprise determining a second head position of a second user in the display system, the second head position being used at least for geometry-correction purposes, while determining the second head position, determining that a second night-vision-enhancer device is activated by the second user, activating a second night-vision mode of the display system on a second display channel of the at least two display channels of the image generator module associated with the second user and, upon activation of the night-vision mode on the first display channel and the second display channel, rendering night-vision-enhanced images of the computer generated environment for display. The night-vision-enhanced images present a night-mode-adapted wavelength spectrum on both the first display channel and the second display channel.

The night-mode-adapted wavelength spectrum may prevent damage to the night-vision-enhancer device. The method may further comprise logging an event when the night-vision-enhancer device is inappropriately activated.

The night-vision-enhanced images may be stereoscopic night-vision-enhanced images and the method may further comprise, while determining the head position, determining a user's sightline and a user's eye-level horizontal rotational attitude for further ensuring correct rendering of the stereoscopic images and, upon activation of the night-vision mode, translating the user's sightline considering the difference between the user's sightline and an expected light-sensor position of the night-vision-enhancer device.

The method may further comprise loading a simulation model comprising the computer generated environment from at least one simulation database for generating the images, the at least one simulation database comprising additional data for the night-vision mode for at least one element of the computer generated environment, providing an instrument module comprising at least one physical interface element to the user of the display system and providing a simulation engine module for managing a computer simulation in the display system by computing the simulation model from inputs obtained from the instrument module and a plurality of simulation parameters of the computer simulation.

The method may further comprise, upon activation of the night-vision mode, modifying at least one light-emitting system of the instrument module towards a night-mode-adapted wavelength spectrum.

BRIEF DESCRIPTION OF THE DRAWINGS

Further features and exemplary advantages of the present invention will become apparent from the following detailed description, taken in conjunction with the appended drawings, in which:

FIG. 2 is a flow chart of an exemplary method in accordance with the teachings of the present invention;

DETAILED DESCRIPTION

Figure 1:
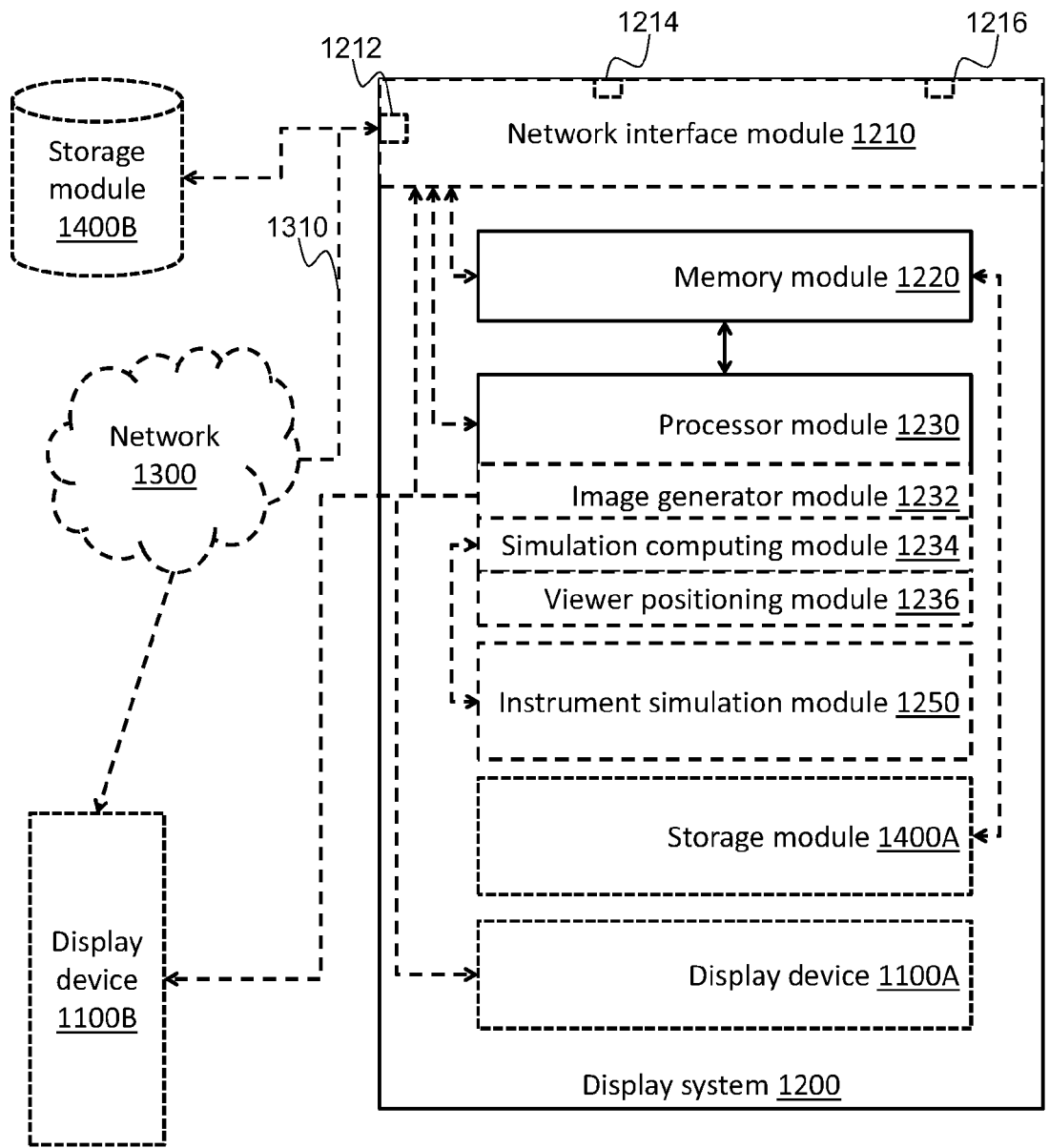
FIG. 1 is a modular representation of an exemplary display system in accordance with the teachings of the present invention.

Reference is now made to the drawings in which FIG. 1 shows a logical representation of an exemplary display system 1200 in accordance with the teachings of the present invention. FIG. 1 also shows a logical representation of an optional network 1300 that may be used in certain embodiments of the present invention. The display system 1200 comprises a memory module 1220 and a processor module 1230. A display device is provided with the display system 1100A and/or in communication with the display system 1100B (both solutions being referred to as 1100). The display device 1100 may comprise at least one physical display unit, and may also comprise many display units of one or more technologies (e.g., Cathode Ray Tube (CRT), Liquid Crystal Display (LCD) screen or projector, any means to project the image onto a screen, mirror and/or display surface, superimposed display in glasses, virtual reality, retinal scanners, etc.). A storage module is provided with the display system 1400A and/or in communication with the display system 1400B (both solutions being referred to in the description as 1400). The storage devices module 1400A and/or 1400B may represent one or more logical or physical as well as local or remote hard disk drive (HDD) (or an array thereof). The storage devices module 1400 may further represent a local or remote database made accessible to the display system 1200 by a standardized or proprietary interface. The display system 1200 may, in certain embodiments, comprise a network interface module 1210 and an instrument simulation module 1250. The processor module may further comprise, or may be seen logically as comprising, an image generator module 1232, a simulation computing module 1234, and a viewer positioning module. The image generator module 1232 may also comprise one or more dedicated graphical processing units. When considered together as a single unit, the display system 1200 and the image generator module 1232 are sometimes referred to as a visual system.

The network interface module 1210, e.g., through one or more of its interfaces (e.g., 1212, 1214, 1216), may be used in the context of the present invention to communicate through the network 1300 with the display device 1100B (e.g., display data over Ethernet) and/or with the storage module 1400B (e.g., to store and/or load a model of a computer simulation). The one or more interfaces may use different protocols and physical medium (e.g., local area network (LAN) over twisted pair cables, wireless LAN, wide area network (WAN) over cable, optical fiber, cellular, etc.), metropolitan area network MAN), etc.).

In accordance with a first set of embodiments, the display system 1200 displays a stream of images on the display device 1100 based on the sightline of the viewer. The sightline of the viewer generally refers to the information about the viewer's eye position in the display system 1200 required by the display system 1200 to generate the stream of images within expected realism limits. In some embodiments, the sightline represents the general position of the user in the display system 1200. In some other embodiments, the sightline is more specifically the line from the viewer's eyes to the display device 1100. Skilled person will readily understand what the sightline of the viewer represents in the different examples provided in the following description.

The display system 1200 is for displaying the stream of images. In the context of the illustrated example, the distance between the display device 1100 and the viewer may be shorter than is necessary for a collimated display. The display device 1100 comprises any means for projecting an image on a screen. The display system 1200 provides some means of correcting the geometry of the displayed objects in order to simulate or enhance the parallax effect.

Figure 3:
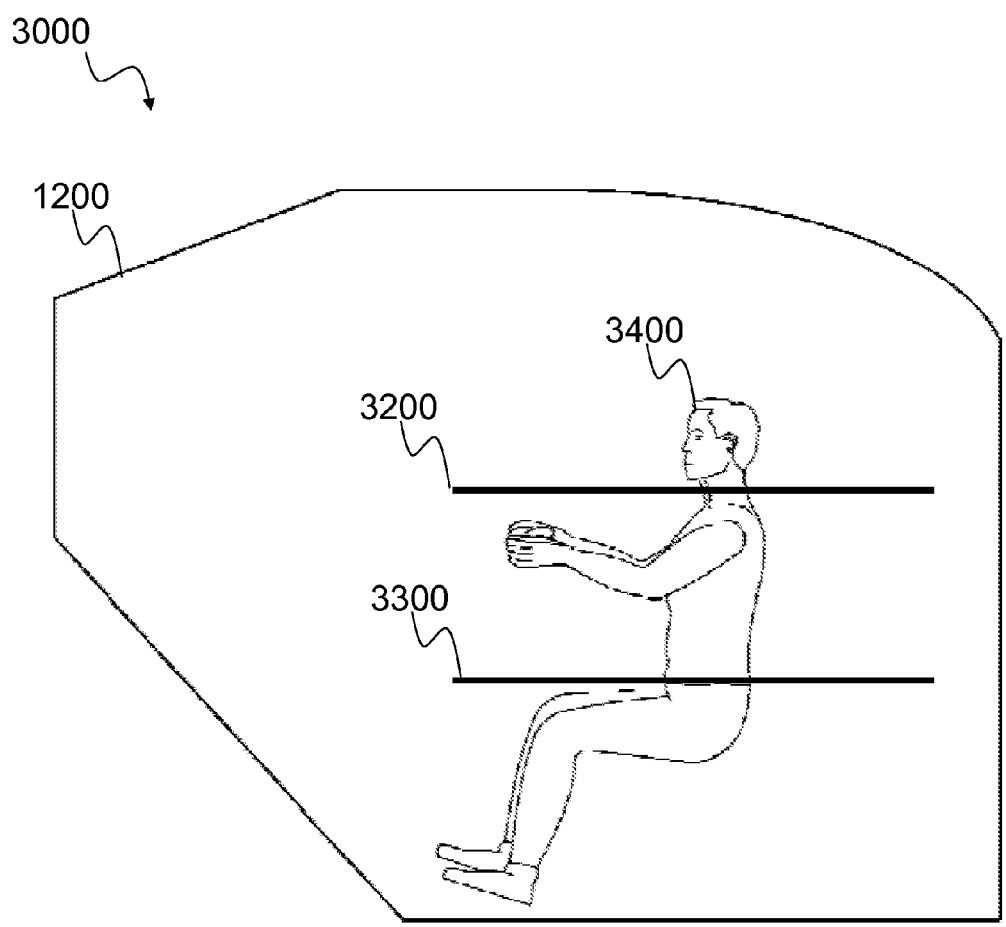
FIG. 3 is a logical representation of a user with the exemplary display system in accordance with the teachings of the present invention.

Reference is now concurrently made to FIGS. 1 and 3. FIG. 3 shows a viewer 3400 seated within an exemplary display system 1200. The viewer positioning module 1236 is for determining a viewer's sightline (or multiple sightlines for different viewers). A first factor of the sightline is defined as a lateral position in the display system 1200 of a viewer's body part located between the viewer's chin 3200 and the viewer's waistline 3300. A second factor of the sightline is defined as a depth position in the display system 1200 of the body part. The viewer's body part is preferably the viewer's chest, and close to the viewer's head, without losing the computational advantages provided by avoiding many and/or frequent movements of the head from consideration. Of course, skilled persons will recognize that multiple body parts of the viewer may also be tracked (e.g., an average of the body parts positions being used to minimize the error and/or jitter) without affecting the present teachings. The sightline is computed based at least on the first factor and the second factor. The image generator module 1232 generates the stream of images for display on the display device 1100 based on the computed sightline. When the tracking point is on the viewer's head, the frequent changes in the rotational attitude of the viewer's head causes the image generator module 1232 to update frequently, which increases image jitter and decreases the user's perceived realism. To replicate or enhance the parallax effect, the depth and lateral position of the viewer's sightline may be used. By using a point on the body between the viewer's chin and waistline as the tracking point, the depth and lateral position of the viewer's are tracked sightline without necessarily tracking all the minute changes in the viewer's head position. This results in a fluid and more realistically perceived stream of images from the image generator module 1232. Preferably, the viewer is in the seated position. Alternatively, the user may be in motion or in the standing position, for example for gunnery training.

Persons skilled in the art will readily recognize that the invention in accordance with the first set of embodiments may also be applicable for more than one viewer in the display system 1200. More specifically, the viewer positioning module 1236 may also define a first factor of the sightline for each of the viewers (defined as a lateral position in the display system 1200 of each viewer's body part located between their chin and their waistline). A second factor of the sightline for each of the viewers may be defined as a depth position in the display system 1200. When more than one viewers are present in the display system 1200, the image generator module 1232 generates one stream of images (or one stream of stereoscopic images when 3D is used) for each of the viewers for display on the display device 1100 based on each of the computed sightlines. Display channels may be added in order to add more separate streams of images for additional users. However, as each new channel results in a reduction of image quality, a limit to the number of channels that may be added is reached when the perceived image quality is not sufficient for the purpose of the display system 1200. While it has been tested to have up to four channels without significant reduction in the image quality, it is expected that more channels could be added. Skilled persons will readily understand that the present invention in accordance with the first set of embodiments is not limited by the number of channels provided by the display system 1200.

In the context of the illustrated example, the image generator module 1232 may further be for generating the stream of images and a second stream of images thereby forming a stream of stereoscopic images. The viewer positioning module 1236 may further be for defining a third factor of the sightline as a viewer's eye-level horizontal rotational attitude, wherein computing the sightline is further based on the first factor, the second factor and the third factor for ensuring correct generation of the stream of stereoscopic images. To generate a realistic stream of stereoscopic images, the image generator module 1232 takes into consideration the viewer's eye-level horizontal rotational attitude. Since neither the first factor nor the second factor tracks the viewer's eye-level horizontal rotational attitude, a third factor is required.

The viewer positioning module 1236 may define the first factor of the sightline as the position of the body part by dynamically determining a lateral position of the body part and combining the lateral position with a static viewer's expected depth position of the viewer in the display system 1200. In the context of the first set of embodiments, the viewer may be seated in a seat such that the viewer's viewing depth from the display device 1100 will be more or less static throughout the viewing of the stream of images. Consequently, in some embodiments, it is unnecessary for the viewer positioning module 1236 to dynamically track the viewer's depth. The viewer positing module 1236 may simply dynamically track the viewer's lateral position. The image generator module 1232 may then use this dynamically determined lateral position along with the expected depth of the viewer. A skilled person will readily understand that the expected depth could be a static value stored in the storage module 1400 of the display system 1200. The expected depth could also be an input value that a user inputs into the display system 1200. The expected depth could also be calculated dynamically (e.g., at runtime) or statically (e.g., when the display system 1200 is initiated) based on a depth position of the viewer seat.

The viewer positioning module 1236 of the display system 1200 may also optionally define the first factor and the second factor of the sightline as the position of the body part by dynamically determining a lateral and a depth position of the body part in the display system 1200. In this case, the depth position of the body part may be determined dynamically in a similar manner to the lateral position of the body part.

The viewer positioning module 1236 may optionally be for defining a third factor of the sightline by dynamically determining the expected eye-level height. A skilled person will readily understand that it is possible to dynamically determine the eye-level height of the viewer using a facial recognition system. Once the eye-level height has been determined, the display system 1200 may calculate the third factor as the difference between the body part tracked by the first factor and second factor and the eye-level height. The second factor can then be used to calculate the sightline based on the dynamically tracked first factor and second factor. The eye-level height may only be measured once at the beginning of the simulation. It may not need to be continuously tracked throughout the simulation. Alternatively, the eye-level height or the difference between the tracked body part and the eye-level height could be an input to the display system 1200 by a user. As another alternative, the difference between the tracked body part and the eye-level height could be an expected difference based on a statistical average. This expected eye-level height could be stored on the storage module 1400.

Optionally, the viewer positioning module 1236, once the body part is determined to be moving, defines the first factor and second factor of the sightline further using a predictive relative position factor of the body part. A skilled person will readily recognize that it is possible to predict the movement of the body part tracked by the first factor and second factor once the body part tracked is in movement, e.g., using software. Predicting the movement of the body part in this way may improve the fluidity of the stream of images generated by the image generator module 1232.

The viewer positioning module 1236, may obtain the position of the viewer's body part by image recognition, matching an expected outfit with a viewer's actual outfit. For example, in the case of military and civil aircraft simulators, the pilots may wear their uniforms during the simulation. The viewer positioning module 1236 could obtain the position of the viewer's body part by tracking an expected piece of insignia on the viewer's uniform.

The viewer positioning module 1236 may optionally obtain the position of the viewer's body part by determining a reflector position of an infra-red or near infra-red reflector on the body part. A skilled person will readily understand how to track the infra-red or near infra-red reflector attached to the body part by emitting an infra-red or near infra-red light and detecting the location of the reflection of that light.

The viewer positioning module 1236 may as another option obtain the position of the viewer's body part by determining a tracker position of a magnetic tracker on the body part. A skilled person will readily understand how to track the body part by detecting the location of the magnetic tracker.

The viewer positioning module 1236 may also obtain the position of the viewer's body part by using ultrasonic emitters. An array of ultrasonic emitters may be placed on the back of the seat or on the headrest of the seat to determine the position of the viewer relative to the seat. The viewer's sightline may then be determined based on the known or detected position of the seat.

As another optional alternative, the viewer positioning module 1236 may obtain the position of the viewer's body part by determining a relative position between a seat of the display system 1200 and the body part. The seat may provide an array of position detectors for determining the relative position. The viewer positioning module 1236 may calculate the position of the viewer's body part based on the known position of the seat and the determined relative position between the seat and the body part. The position of the seat could be statically stored on the storage module 1400. Furthermore and as an alternative, as the seat is moved, the position of the seat stored on the storage module 1400 could be dynamically updated. As another alternative, the position of the seat could be manually entered into the display system 1200 by a user. Optionally, the position of the seat could be dynamically detected.

The viewer positioning module 1236 could optionally obtain the position of the viewer's body part by determining a wearable device position of a wearable element of the display system 1200 worn on the body part. For example, in a vehicle simulation, the viewer may be wearing a seatbelt. The position of the viewer's body part could be determined by tracking a portion of the seatbelt (e.g., the buckle of the seatbelt) using image recognition software.

The viewer positioning module 1236 may optionally use more than one of the above tracking methods concurrently or sequentially. As skilled persons will readily understand, some tracking or detection methods work better under certain conditions (e.g., lighting condition, presence of background magnetic field and/or electromagnetic field, etc.). In certain situations, it may be possible to achieve a more accurate tracking the viewer's sightline by combining the results of multiple tracking methods. The viewer positioning module 1236 may also conditionally select one or more tracking methods. For example, the viewer positioning module 1236 may use an image recognition tracking method under normal conditions, and then switch to an ultrasonic tracking method when the display system 1200 enters a night-vision mode. A skilled person will readily understand that the viewer positioning module 1236 may be better able to track the viewer's sightline under different modes and conditions by conditionally selecting the tracking method.

The image generator module 1232 may optionally load a simulation model from at least one simulation database for generating the stream of images. The simulation database may be stored on the storage module 1400, or remotely on another device on the network 1300. The instrument module 1250 may provide at least one physical interface element to the viewer of the display system 1200. The simulation computing module 1234 may be for managing a computer simulation in the display system 1200, the simulation computing module 1234 may further be for computing the simulation model from inputs obtained from the instrument module 1250 and a plurality of simulation parameters of the computer simulation.

The computer simulation may, for instance, be used for training purposes and/or for enacting a scenario from historical data (e.g. from an event recording device (e.g., a black box) from an aircraft, a train, etc.). The computer simulation may be scenario-based (e.g., where simulation code driving the simulated environment comprises one or more predetermined events, motions, sounds, etc.).

The computer simulation may be a vehicle computer simulation and a field of view for rendering the image may be defined from a user's position within a simulated vehicle. The present invention is not limited by the type of simulated vehicle, which may be terrestrial (car, tank, etc.), underground, airborne (e.g., an aircraft, a space shuttle), floating (e.g., a boat), etc. The field of view, or point of view, may be defined from the position of a trainee of the simulated vehicle (e.g., interacting with the simulation) and/or the position of an operator of the simulated vehicle (e.g., only determining content of the simulation code or participating to the simulation as well).

FIG. 2 shows a flow chart of an exemplary method 2000 for displaying a stream of images comprising in accordance with a first set of embodiments of the present invention. The method comprises defining 2010 a first factor of a viewer's sightline as a lateral position in a display system of a viewer's body part located between a viewer's chin and a viewer's waistline and defining 2020 a second factor of the sightline as a depth position in the display system of the body part. The method then follows with computing 2030 the sightline based at least on the first factor and the second factor and generating 2040 the stream of images considering the determined sightline before displaying 2050 the stream of images on a first display screen.

Generating 2040 the stream of images may further comprise generating a second stream of images thereby forming a stream of stereoscopic images. The method 2000 may then further comprise defining a third factor of the sightline as a viewer's eye-level height and horizontal rotational attitude. Computing 2030 the sightline may thus be further based on the first factor, the second factor and the third factor for ensuring correct generation of the stream of stereoscopic images.

Computing 2030 the sightline, in one embodiment, comprises dynamically determining the lateral position of the body part corresponding to the first factor and combining the lateral position with a static viewer's expected depth position of the viewer in the display system corresponding to the second factor. Computing 2030 the sightline, in another embodiment, comprises dynamically determining the lateral position of the body part corresponding to the first factor and the depth position of the body part corresponding to the second factor in the display system.

The method 2000 may further comprise, once the body part is determined to be moving, defining at least one of the first factor and the second factor of the sightline further using a predictive relative position factor of the body part.

Different steps may be taken to define the first factor and/or the second factor for the position of the viewer's body part. For instance, the first factor and/or the second factor may be defined by image recognition matching an expected outfit with a viewer's actual outfit; determining a reflector position of an infra-red or near infra-red reflector on the body part, by determining a tracker position of a magnetic tracker on the body part, by using ultrasonic reflections, by determining a relative position between a seat of the display system and the body part and/or by determining a wearable device position of a wearable element of the display system worn on the body part.

The method 2000 may also further comprise loading a simulation model from at least one simulation database for generating the stream of images, providing at least one physical interface element to the viewer of the display system and managing a computer simulation in the display system by computing the simulation model from inputs obtained from the instrument module and a plurality of simulation parameters of the computer simulation.

Figure 4:
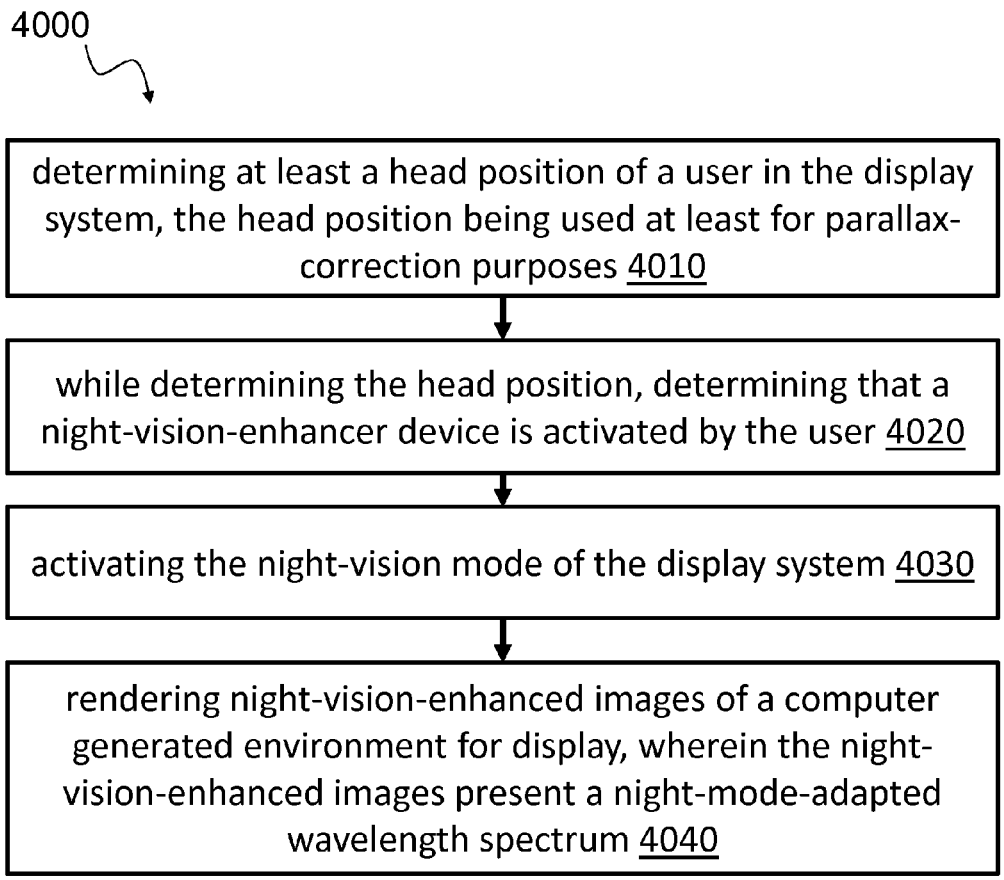
FIG. 4 is a flow chart of an exemplary method in accordance with the teachings of the present invention.
Figure 5:
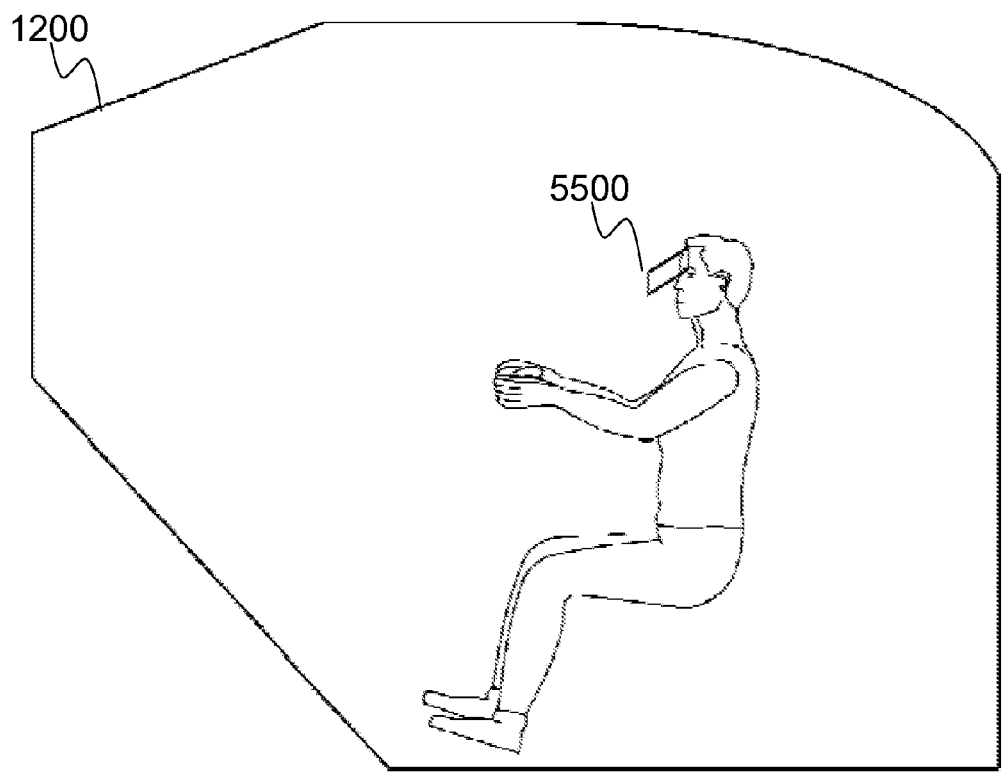
FIG. 5 is a logical representation of a user with the exemplary display system in accordance with the teachings of the present invention.

Reference is now made to FIGS. 1, 4 and 5, which depicts a second set of embodiments of the present invention in which a night-vision mode of the display system 1200 is dynamically activated.

A night-vision-enhancer device 5500 permits a viewer to see in the dark by amplifying the available light and by shifting a portion of the non-visible light spectrum (including a portion of the infra-red light spectrum) into the visible spectrum. Night-vision-enhancer devices typically generate a green phosphor image. Night-vision goggles are an example of a night-vision-enhancer device.

There are at least two ways of replicating night-vision in a computer simulated environment: simulated night-vision and stimulated night-vision. Simulated night-vision simulates night-vision by displaying a stream of images on a display device, which could include a display device incorporated into simulated night-vision goggles, which replicates the green phosphor image typically generated by night-vision-enhancer devices. Simulated night-vision does not use an actual night-vision-enhancer device; the simulated night-vision merely replicates the green phosphor image typically generated by such devices. Stimulated night-vision, by contrast, uses a display device, usually a projector, to generate a stream of images, e.g., within the infra-red spectrum, to stimulate the receptors of an actual night-vision enhancer device. With stimulated night-vision, the viewer wears a normal night-vision-enhancer device 5500 in the simulation.

The preferred embodiment of the second set of embodiments of the present invention uses a form of stimulated night-vision. The processor module 1230 is for determining at least a head position of a user in the display system 1200, the head position being used at least for parallax-effect purposes. While determining the head position, the processor module 1230 determines that a night-vision-enhancer device 5500 is activated by the user, and activates the night-vision mode of the display system 1200. Upon activation of the night-vision mode of the display system 1200, the image generator module 1232 renders night-vision-enhanced images of a computer generated environment for display, wherein the night-vision-enhanced images present a night-mode-adapted wavelength spectrum and brightness range. The night-mode-adapted wavelength spectrum depends on the design of the night-vision-enhancer device 5500, and may comprise presenting images in the infra-red spectrum. The night-vision-enhanced images may continue to be presented using light from the visual spectrum so that a viewer without a night-vision-enhancer device may be able to continue to see the images. However, the brightness range of the images may need to be corrected to ensure they do not damage the night-vision-enhancer device.

In one embodiment, the night-vision mode of the display system 1200 is activated on a first display channel of at least two display channels of the image generator module 1232, the first channel being associated with the first user. Upon activation of the night-vision mode of the display system 1200, night-vision-enhanced images are rendered for display in the night-mode-adapted wavelength spectrum and brightness range for the first display channel while a second display channel of the at least two display channels does not provide night-vision-enhanced images. The first user may wear glasses, or use another device (not shown), that filter the images from the display system 1200 such that the first user only sees the images being displayed on the first channel. Wavelength filtering or synchronized active shutter filtering may be used.

The processor module 1230 may further be for determining a second head position of a second user in the display system 1200, the second head position being used at least for parallax-effect purposes. While determining the second head position, it may be determined that a second night-vision-enhancer device (not shown) has been activated by the second user, and a second night-vision mode of the display system 1200 may be activated on a second display channel of the at least two display channels of the image generator module 1232 associated with the second user. The image generator module 1232 may further be for, upon activation of the night-vision mode on the first display channel and the second display channel, rendering night-vision-enhanced images of a computer generated environment for display. The night-vision-enhanced images may present a night-mode-adapted wavelength spectrum and brightness level on both the first display channel and the second display channel. The second user may wear glasses, or use another device (not shown), that filter the images from the display system such that the second user only sees the images being displayed on the second channel. Wavelength filtering or synchronized active shutter filtering may also be used.

A skilled person will understand that more display channels may be added in order to add more separate streams of images for additional users. However, as each new channel results in a reduction of image quality, a limit to the number of channels that may be added is reached when the perceived image quality is not sufficient for the purpose of the display system 1200. While it has been tested to have up to four channels without significant reduction in the image quality, it is expected that more channels could be added. Skilled persons will readily understand that the present invention in accordance with the second set of embodiments is not limited by the number of channels provided by the display system 1200.

As an option, the processor module 1230 may log an event when the night-vision-enhancer device 5500 is inappropriately activated. The logging may advantageously be performed while activating the night-vision mode, even if the context in which the night-vision-enhancer device 5500 has been activated is improper (e.g., rendering dimmed images that would otherwise represent daytime images) thereby preventing damage to the night-vision-enhancer device 5500. Users of a night-vision-enhancer device 5500 should only put the night-vision-enhancer device 5500 on at nighttime and after they have switched the instrument panel to a night-vision mode. Doing otherwise could result in damage to the night-vision goggles. It may be part of the training session to ensure that the user uses the night-vision-enhancer device 5500 properly so that it will be beneficial to track any improper use.

The night-vision-enhanced images may be stereoscopic night-vision-enhanced images. The processor module 1230 may further be for determining a user's sightline and a user's eye-level horizontal rotational attitude for further ensuring correct rendering of the stereoscopic images. The processor module 1230 may further be for upon activation of the night-vision mode, translating the user's sightline considering the difference between the user's sightline and an expected light-sensor position of the night-vision-enhancer device. When the viewer is wearing night-vision goggles, the viewer's sightline shifts from the viewer's eyes to the light-sensor position of the night-vision goggles. If this shift in the sightline is not taken into consideration, there may be a noticeable error in the generated stereoscopic images. The position of the light-sensor on the night-vision goggles may be stored statically on the storage module 1400 or may be dynamically detected by the processor module 1230.

Optionally, the image generator module 1232 may further be for loading a simulation model comprising the computer generated environment from at least one simulation database for generating the images, the at least one simulation database comprising additional data for the night-vision mode for at least one element of the computer generated environment. Alternatively, the simulation database may not contain additional data for the night-vision mode. Instead, the night-vision mode images may be generated at run-time before or after processing by the image generator module 1232. The simulation database may be stored on the storage module 1400, in the memory module 1220, or remotely on another device on the network 1300. The display device 1100 may be for presenting images in a night-mode adapted wavelength spectrum. Alternatively, there may be two display devices 1100, one for generating images in the visual wavelength spectrum, the other for generating images in the night-mode adapted wavelength spectrum and brightness range. The additional data for the night-vision mode may enable the image generator module 1232 to generate a stream of images on the display device 1100 in the night-mode adapted wavelength spectrum. The images in the visual wavelength spectrum may be the same as those generated in the night-mode wavelength spectrum such that a viewer wearing a night-vision-enhancer device 5500 will see the same images as a viewer not wearing such a device. Alternatively, the images may be different so that the two viewers will see a different stream of images. The night-mode wavelength spectrum images, typically infra-red and near infra-red, may stimulate the night-vision-enhancer device 5500 to generate the green phosphor image, permitting the viewer wearing the device to see the desired images. In a preferred embodiment of the present invention, the display device 1100 is a projector capable of projecting both images within the visual spectrum as well as images in the non-visible infra-red and near infra-red spectrum.

The display system 1200 may optionally further comprise an instrument module 1250 for providing at least one physical interface element to the user of the display system 1200; and a simulation engine module 1234 for managing a computer simulation in the display system 1200, the simulation engine module 1234 computing the simulation model from inputs obtained from the instrument module and a plurality of simulation parameters of the computer simulation.

As an option, upon activation of the night-vision mode, the instrument module 1250 may modify at least one light-emitting system thereof towards a night-mode-adapted wavelength spectrum. The light usually emitted from the instrument module 1250 may damage the night-vision-enhancer device 5500 or pollute the visual environment, and the light also may not be visible to a viewer wearing the device. To avoid this damage and pollution and to enable the viewer wearing the night-vision-enhancer device 5500 to see the instrument module 1250, when the night-vision mode is activated, the instrument module 1250 may emit light within a wavelength spectrum that will not damage the night-vision-enhancer device 5500 and that will be visible to the viewer wearing the device.

In another embodiment of the present invention, the processor module 1230 may determine that a night-vision-enhancer device 5500 is activated by the user by detecting a modified eye lighting pattern using image recognition once the night-vision-enhancer device 5500 is in an active position. Night-vision-enhancer devices typically emit light. When a user wears a night-vision-enhancer device, this light is typically visible around the device. This light may be detected by a standard method of image recognition for the purpose of determining when the user has begun to use the night-vision-enhancer device. Alternatively, the activation of the night-vision-enhancer device 5500 may be detected based on an expected night-vision-enhancer device 5500 shape using image recognition once the night-vision-enhancer device 5500 is in an active position. Standard image recognition may be used to determine the change in the shape of the user's face when the night-vision-enhancer device 5500 is put on. Alternatively, the activation of the night-vision-enhancer device 5500 may be determined by receiving an activation signal from a wireless network interface of the night-vision-enhancer device. The night-vision-enhancer device 5500 may include a wireless network interface such as WIFI™ or Bluetooth™. The night-vision-enhancer device 5500 may then send a signal via this network interface to the display system 1200 to register that the night-vision-enhancer device 5500 has been activated. Alternatively, activation of the night-vision-enhancer device 5500 may be detected using a hidden reflector on the night-vision-enhancer device. The display system 1200 may emit a light or other wave signal. When the light or other wave signal is reflected by the hidden reflector on the night-vision-enhancer device, the processor module 1230 determines that the night-vision-enhancer device 5500 has been activated. Alternatively, activation of the night-vision-enhancer device 5500 may be detected using a hidden emitter once the night-vision-enhancer device 5500 is in an active position. The hidden emitter might emit such things as a light or radio signal that can be detected by the display system 1200. Alternatively, activation of the night-vision-enhancer device 5500 may be detected by way of a modified power consumption pattern once the night-vision-enhancer device 5500 is in an active position. The night-vision-enhancer device 5500 uses electric power from either batteries or other electric power source when the night-vision-enhancer device 5500 is operating. By detecting a change in the usage of power by the night-vision-enhancer device, the display system 1200 could determine when the night-vision-enhancer device 5500 has been activated. Alternatively, activation of the night-vision-enhancer device 5500 may be detected by way of a modified electromagnetic field in the display system 1200 once the night-vision-enhancer device 5500 is in an active position. When the night-vision-enhancer device 5500 is in the active position, the night-vision-enhancer device 5500 may emit an electromagnetic field that the display system 1200 can detect. Once the display system 1200 has detected that the night-vision-enhancer device 5500 has been activated, the night-vision mode of the display system 1200 may be activated. Once the night-vision mode of the display system 1200 has been activated, the image generator module 1232 may generate night-vision-enhanced images of a computer generated environment for display, wherein the night-vision-enhanced images present a night-mode-adapted wavelength spectrum.

FIG. 4 shows a flow chart of an exemplary method 4000 in accordance with the present invention. The method 4000 is for dynamically activating a night-vision mode in a display system. The method 4000 comprises determining 4010 at least a head position of a user in the display system, the head position being used at least for geometry-correction purposes and, while determining the head position, determining 4020 that a night-vision-enhancer device is activated by the user. The method 4000 then follows with activating 4030 the night-vision mode of the display system and, upon activation of the night-vision mode of the display system, rendering 4040 night-vision-enhanced images of a computer generated environment for display, wherein the night-vision-enhanced images present a night-mode-adapted wavelength spectrum.

Activating 4030 the night-vision mode of the display system further comprises activating the night-vision mode on a first display channel of at least two display channels of the image generator module, the first channel being associated with the first user. Upon activation of the night-vision mode of the display system 1200, night-vision-enhanced images are rendered for display in the night-mode-adapted wavelength spectrum for the first display channel while a second display channel of the at least two display channels does not provide night-vision-enhanced images.

The method 4000 may further comprise determining a second head position of a second user in the display system, the second head position being used at least for geometry-correction purposes and, while determining the second head position, determining that a second night-vision-enhancer device is activated by the second user. In this example, the method 4000 then follows with activating a second night-vision mode of the display system on a second display channel of the at least two display channels of the image generator module associated with the second user. The method 4000 may then further comprise, upon activation of the night-vision mode on the first display channel and the second display channel, rendering night-vision-enhanced images of the computer generated environment for display. The night-vision-enhanced images then present a night-mode-adapted wavelength spectrum on both the first display channel and the second display channel.

The night-mode-adapted wavelength spectrum may prevent damage to the night-vision-enhancer device. The method 4000 may further comprise logging an event when the night-vision-enhancer device is inappropriately activated.

The night-vision-enhanced images may be stereoscopic night-vision-enhanced images and the method 4000 may further comprise, while determining the head position, determining a user's sightline and a user's eye-level horizontal rotational attitude for further ensuring correct rendering of the stereoscopic images and, upon activation of the night-vision mode, translating the user's sightline considering the difference between the user's sightline and an expected light-sensor position of the night-vision-enhancer device.

The method 4000 may further comprise loading a simulation model comprising the computer generated environment from at least one simulation database for generating the images, the at least one simulation database comprising additional data for the night-vision mode for at least one element of the computer generated environment, providing an instrument module comprising at least one physical interface element to the user of the display system; and providing a simulation engine module for managing a computer simulation in the display system by computing the simulation model from inputs obtained from the instrument module and a plurality of simulation parameters of the computer simulation.

The method 4000 may further comprise, upon activation of the night-vision mode, modifying at least one light-emitting system of the instrument module towards a night-mode-adapted wavelength spectrum.

The present invention is not affected by the way the different modules exchange information between them. For instance, the memory module and the processor module could be connected by a parallel bus, but could also be connected by a serial connection or involve an intermediate module (not shown) without affecting the teachings of the present invention.

A method is generally conceived to be a self-consistent sequence of steps leading to a desired result. These steps require physical manipulations of physical quantities. Usually, though not necessarily, these quantities take the form of electrical or magnetic/electromagnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities. The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A display system for dynamically activating a night-vision mode comprising:
 a processor module that:
  determines at least a head position of a user in the display system, the head position being used at least for geometry-correction purposes;
  while determining the head position, dynamically detects that a night-vision-enhancer device is in active position, thereby determining that the night-vision-enhancer device is activated by the user; and
  upon determining that the night-vision-enhancer device is activated by the user, activates the night-vision mode of the display system; and
 the processor module comprising an image generator module that:
  upon activation of the night-vision mode of the display system, renders geometry-corrected night-vision-enhanced images of a computer generated environment for display by the display system, wherein the night-vision-enhanced images present a night-mode-adapted wavelength;
  loads a simulation model comprising the computer generated environment from at least one simulation database for generating the images, the at least one simulation database comprising additional data for the night-vision mode for at least one element of the computer generated environment;
 an instrument panel that provides at least one physical interface element to the user of the display system; and
 a simulation engine module that manages a computer simulation in the display system, the simulation engine module computing the simulation model from inputs obtained from the instrument panel and a plurality of simulation parameters of the computer simulation;
 wherein, upon activation of the night-vision mode, the instrument panel modifies at least one light-emitting system thereof towards the night-mode-adapted wavelength spectrum.

2. The display system of claim 1, wherein the night-vision mode of the display system is activated on a first display channel of at least two display channels of the image generator module, the first channel being associated with the user and wherein, upon activation of the night-vision mode of the display system, night-vision-enhanced images are rendered for display in the night-mode-adapted wavelength spectrum for the first display channel while a second display channel of the at least two display channels does not provide night-vision-enhanced images.

3. The display system of claim 2, wherein the processor module further:
 determines a second head position of a second user in the display system, the second head position being used at least for geometry-correction purposes;
 while determining the second head position, determines that a second night-vision-enhancer device is activated by the second user;
 upon determining that the second night-vision-enhancer device is activated by the second user, activates a second night-vision mode of the display system on a second display channel of the at least two display channels of the image generator module associated with the second user; and
 wherein the image generator module further, upon activation of the night-vision mode on the first display channel and the second display channel, renders geometry-corrected night-vision-enhanced images of the computer generated environment for display, wherein the night-vision-enhanced images present a night-mode-adapted wavelength spectrum on both the first display channel and the second display channel.

4. The display system of claim 1, wherein the night-mode-adapted wavelength spectrum prevents damage to the night-vision-enhancer device.

5. The display system of claim 4, wherein the processor module further logs an event when the night-vision-enhancer device is inappropriately activated.

6. The display system of claim 1, wherein the night-vision-enhanced images are stereoscopic night-vision-enhanced images and wherein the processor module further:
 while determining the head position, determines a user's sightline and a user's eye-level horizontal rotational attitude for further ensuring correct rendering of the stereoscopic images; and
 upon activation of the night-vision mode, computes a translation value for the user's sightline considering the difference between the user's sightline and an expected light-sensor position of the night-vision-enhancer device.

7. A method for dynamically activating a night-vision mode in a display system comprising:
 loading a simulation model comprising a computer generated environment from at least one simulation database for generating images, the at least one simulation database comprising additional data for the night-vision mode for at least one element of the computer generated environment;
 determining at least a head position of a user in the display system, the head position being used at least for geometry-correction purposes;
 while determining the head position, dynamically detects that a night-vision-enhancer device is in active position, thereby determining that a night-vision-enhancer device is activated by the user;
 upon determining that the night-vision-enhancer device is activated, activating the night-vision mode of the display system;
 upon activation of the night-vision mode of the display system, rendering geometry-corrected night-vision-enhanced images of the computer generated environment for display by the display system, wherein the night-vision-enhanced images present a night-mode-adapted wavelength spectrum;
 providing an instrument panel comprising at least one physical interface element to the user of the display system;
 providing a simulation engine module for managing a computer simulation in the display system by computing the simulation model from inputs obtained from the instrument panel and a plurality of simulation parameters of the computer simulation; and
 upon activation of the night-vision mode, modifying at least one light-emitting system of the instrument panel towards the night-mode-adapted wavelength spectrum.

8. The method of claim 7, wherein activating the night-vision mode of the display system further comprises activating the night-vision mode on a first display channel of at least two display channels of the image generator module, the first channel being associated with the user and wherein upon activation of the night-vision mode of the display system, geometry-corrected night-vision-enhanced images are rendered for display in the night-mode-adapted wavelength spectrum for the first display channel while a second display channel of the at least two display channels does not provide night-vision-enhanced images.

9. The method of claim 8, further comprising:
  determining a second head position of a second user in the display system, the second head position being used at least for geometry-correction purposes;
  while determining the second head position, determining that a second night-vision-enhancer device is activated by the second user;
  upon determining that the second night-vision-enhancer device is activated by the second user, activating a second night-vision mode of the display system on a second display channel of the at least two display channels of the image generator module associated with the second user; and
  upon activation of the night-vision mode on the first display channel and the second display channel, rendering geometry-corrected night-vision-enhanced images of the computer generated environment for display, wherein the night-vision-enhanced images present a night-mode-adapted wavelength spectrum on both the first display channel and the second display channel.

10. The method of claim 7, wherein the night-mode-adapted wavelength spectrum prevents damage to the night-vision-enhancer device.

11. The method of claim 10, further comprising logging an event when the night-vision-enhancer device is inappropriately activated.

12. The method of claim 7, wherein the night-vision-enhanced images are stereoscopic night-vision-enhanced images and wherein the method further comprises:
  while determining the head position, determining a user's sightline and a user's eye-level horizontal rotational attitude for further ensuring correct rendering of the stereoscopic images; and
  upon activation of the night-vision mode, computing a translation value for the user's sightline considering the difference between the user's sightline and an expected light-sensor position of the night-vision-enhancer device.

* * * * *